3,522,504
REGULATED MOTOR CONTROL CIRCUIT
Edward F. Rigby, Highland Park, Mich., assignor to
Ram Meter Inc., Ferndale, Mich., a corporation of
Michigan
Filed Oct. 26, 1966, Ser. No. 589,678
Int. Cl. H02p 5/16
U.S. Cl. 318—332                                    11 Claims

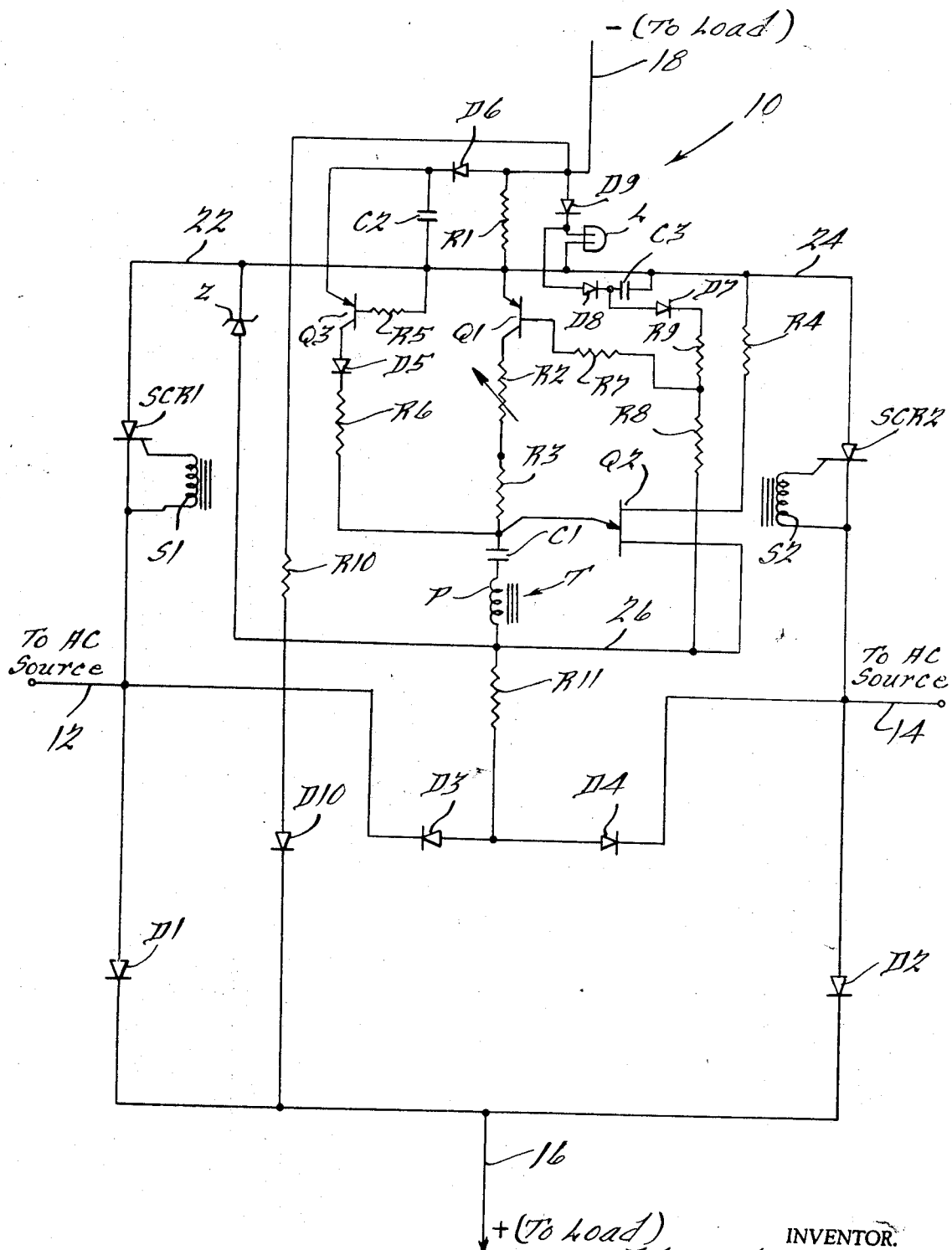

ABSTRACT OF THE DISCLOSURE

A load control circuit for controlling the magnitude of the current to an electric motor from a source of alternating potential including apparatus for sensing the magnitude of the motor load and for varying the current to the motor in accordance therewith, and further including control apparatus for selectively varying the current to the motor, with the circuit including an overload circuit having a time delay for eliminating its actuation in response to transients.

---

The present application relates to electric motor control circuits and more particularly to a regulated motor control circuit wherein the speed of the motor is regulated over a substantial load range.

It is an object of the present invention to provide a control circuit to regulate the current to a variable load.

It is an object of the present invention to provide a control circuit to control the speed of an electric motor.

It is another object of the present invention to provide a control circuit to control the speed of an electric motor and to regulate the speed whereby it is maintained at a selected magnitude over a substantial range in the motor load.

It is another object of the present invention to provide a control circuit for an electric motor for regulating the speed of the electric motor and in addition for providing automatic overload protection to the motor.

It is another object of the present invention to provide a novel control circuit for regulating the speed of an electric motor from a source of alternating current with the motor being energized with direct current.

It is another object of the present invention to provide a regulated control circuit for regulating the speed of an electric universal motor from a source of alternating current potential and enegizing the motor on rectified AC or DC potential and providing overload protection for the motor.

Other objects, features, and advantages of the present invention will become apparent from the subsequent description and the appended claims, taken in conjunction with the accompanying drawing which is an electrical schematic diagram of a preferred form of a regulated control circuit for an electric motor.

Looking now to the drawing, the regulated control circuit is shown and is generally indicated by the numeral 10 and has a pair of input conductors 12 and 14 which can be connected to the source of AC power (not shown). The output from the regulated control circuit 10 is a direct potential and can be taken from the control circuit 10 by means of conductors 16 and 18 with the conductor 16 being at a positive potential and the conductor 18 being at a negative potential. While in the specific application shown, the conductors 16 and 18 are to be connected to a universal AC–DC motor, it should be understood that features of the present invention as exemplified by the control circuit 10 may be used with apparatus other than universal electric motors.

The conductor 18 is connected to one end of a signal resistor R1 with the other end of the resistor R1 being connected to a pair of conductors 22 and 24. Conductor 22 is connected to the anode of a silicon controlled rectifier SCR 1 which has its cathode connected to the AC conductor 12. The conductor 24 is connected to the anode of another silicon controlled rectifier SCR 2, which has its cathode connected to the AC conductor 14. A diode D1 is connected from the AC conductor 12 to the positive DC conductor 16, while a second diode D2 is connected from the AC conductor 14 to the positive DC conductor 16. In the circuit described thus far, the universal motor connected across the DC conductors 16 and 18 will receive power from the AC lines 12 and 14, such that with the conductor 12 at a positive potential current will flow through the diode D1 to the positive conductor 16 through the motor, through the conductor 18' through the signal resistor R1, through the principal electrodes of the SCR 2 and to the AC conductor 14. When the AC conductor 14 is positive, current will flow through the diode D2, through the positive conductor 16, through the motor, through the negative conductor 18' through the signal resistor R1, through the principal electrodes of SCR 1 and back to the AC source via the AC conductor 12. Thus the motor receives pulsating DC current with the duration of the pulses being controlled by the time period of conduction of SCR 1 and SCR 2.

The conduction of SCR 1 is controlled by potential appearing between the gate and cathode by means of a secondary winding S1 with the conduction of the SCR 2 being similarly controlled by the potential of the secondary winding S2; the secondaries S1 and S2 are part of a transformer T having a primary winding P.

The primary P of the transformer T is a part of the basic control circuit to be presently described. The basic control circuit includes a variable resistor R2 which can be varied to control the power delivered to the motor which is connected across the conductors 16 and 18 and hence provides a manual control for the speed of the motor. Variable resistor R2 is connected to a fixed resistor R3 such that even with the variable resistor R2 at a zero resistance position, R3 provides a preselected amount of fixed resistance in the circuit. Resistances R2 and R3 are connected in series with the collector emitter circuit of a p-n-p type transistor Q1, with the collector being connected to the variable resistor R2 and with the emitter being connected to the signal resistor R1 at the juncture of conductors 22 and 24. A unijunction transistor Q2 has its emitter connected to the end of resistor R3 and has its base 1 connected to one end of the primary P of transformer T by means of a conductor 26 and has its base 2 connected to the conductor 24 by means of a resistor R4. A capacitor C1 connects the opposite end of the primary P to the emitter of the unijunction Q2. A dropping or current limiting resistor R11 is connected from one end of primary P to the anodes of a pair of diodes D3 and D4. The cathode of diode D3 is connected to the AC conductor 12 while the cathode of diode D4 is connected to the AC conductor 14. A Zener diode Z is connected from the conductor 22 to the juncture between the resistor R11 and the primary P and regulates the voltage across the control circuit. The diodes D3 and D4 provide for a return current path to the AC lines 12 and 14 for the current through DC line 18 and through the signal resistor R1. Note that this portion of the circuit is conductive even though the controlled rectifiers SCR1 and SCR2 may be in a nonconductive state. For example, assuming that the transistor Q1 is conductive, current through resistor R1 will find a path to either of the AC lines 12 and 14 through the collector-emitter circuit of transistor Q1 through the variable resistor R2, resistor R3, capacitor C1, the primary P, the current limiting resistor R11 and one of diodes D3 or D4 (depending upon the polarities of the AC lines 12 and 14). The transistor Q1 is normally conductive and hence current will normally be flowing through the circuit just described.

Q2 and its associated circuit function as a conventional unijunction trigger circuit in which the unijunction Q2 is nonconductive until the charge on capacitor C1 reaches a preselected magnitude at which time, with the proper magnitude of interbase current flowing through the resistor R4, the capacitor C1 will discharge through the emitter-base 1 circuit resulting in current flow through the primary P of the transformer T, which in turn will result in a trigger signal appearing at the secondaries S1 and S2 in the trigger circuits of SCR1 and SCR2. The time for the charge on capacitor C1 to reach the proper magnitude to fire Q2 can be varied by varying the magnitude of resistor R2 and hence the point on the pulsating DC cycle at which the unijunction Q2 fires can be varied thus varying the power delivered to the motor. Thus, by manipulation of resistor R2, the speed of the motor can be selectively set. The capacitor C1 will be charged and will discharge during each half cycle of pulsating DC potential. This assures that the controlled rectifiers SCR1 and SCR2 will be completely turned off after each half cycle and that control of their conduction will be maintained by the control circuit just described. Thus, the charge of capacitor C1 can be considered as a control signal of a variable magnitude with the variation being the time required to attain the required charge to fire Q2.

It can be appreciated that, while the speed can be selected by varying the speed control resistor R2, as the load applied to the motor connected across the DC conductors 16 and 18 is varied, the speed of the motor will tend to vary. In order to provide automatic regulation and automatic speed control additional regulating circuitry is utilized. In general, this regulation is effectuated by a shunt connected across the fixed resistor R3, variable resistor R2 and transistor Q1 whereby the RC time instant of the network including the capacitor C1 is varied. The regulating circuit includes a p-n-p transistor Q3 which has its base connected to conductor 22 by means of a biasing resistor R5, with the collector of transistor Q3 being connected to the juncture between resistor R3 and capacitor C1 by means of a diode D5 which in turn is serially connected to a dropping resistor R6. The emitter of transistor Q3 is connected to the negative DC conductor 18 by means of a diode D6. A capacitor C2 is connected from the emitter of transistor Q3 to conductor 22. The diode D6 blocks the capacitor C2 from discharging back through the resistor R1 while the diode D5 blocks reverse current from the principal electrodes of the transistor Q3.

The signal resistor R1 will provide a voltage drop thereacross which is directly proportional to the current through the motor and through the DC conductor 18. Since the trigger signal provided by the unijunction Q2 can be effective only after the rectifiers SCR1 and SCR2 have been rendered nonconductive and since the capacitor C2 will be charged generally only when the rectifiers SCR1 and SCR2 are conductive, capacitor C2 must store the signal received from the signal resistor R1 in order to be effective upon the firing of the unijunction Q2 for the next succeeding cycle of the pulsating potential to the control rectifiers SCR1 and SCR2. The diode D6 acts as a threshhold device and requires a selected threshhold voltage before any current can flow to the capacitor C2, and hence, a threshhold voltage of insufficient magnitude across resistor R1 will not result in charge of capacitor C2, however, higher voltages indicating heavier currents will. When the charge on capacitor C2 has reached a sufficient magnitude, it will render the transistor Q3 conductive thereby permitting current to flow through its collector emitter circuit, through the diode D5 and resistor R6 to thereby provide a shunt circuit across the charge circuit for the capacitor C1 of the firing circuit of unijunction Q2. The higher the potential that capacitor C2 is charged, the greater will be the current flow through the emitter-collector circuit of transistor Q3; the result will be a smaller resistance across the resistors R2 and R3 and hence a shorter RC time constant resulting in a faster charge time of the capacitor C1 which in turn will result in the unijunction Q2 firing at an earlier point on the half cycles. This in turn results in the rectifiers SCR1 and SCR2 being rendered conductive for greater portions of the half cycles and hence more power or current will be delivered to the motor. Thus, when the motor requires increased current because of an increase in load, the shunting circuit including the transistor Q3, the diode D5 and resistor R6 will automatically compensate to provide the necessary increase in current and hence the speed of the motor will be held at the selected magnitude.

Since the motor is energized by pulsating DC, the reactive effect of the windings of the motor will be substantially minimized and the potential across conductors 16, 18 will see generally only the DC resistance of the motor. In the event of stalling of the motor, currents of high magnitude would result. In order to prevent the development and/or sustaining of excessive currents, an overload circuit is included in the control circuit 10.

In general, the overload circuit which includes the transistor Q1 operates, in the event of an overload, to render transistor Q1 nonconductive thereby rendering the controlled rectifiers SCR 1 and SCR 2 nonconductive and hence preventing excessive current from flowing to the motor. For normal or nonoverload conditions, the transistor Q1 is conductive and hence will not affect the normal regulating effect and operation of the circuit.

More specifically, the transistor Q1 has its base connected to a biasing resistor R7 which in turn is connected to conductor 26 by means of a resistor R8 which is a part of a voltage dividing network that includes a resistor R9 which is also connected to the resistor R7. The resistor R9 is connected to the cathode of a diode D7 which has its anode connected to one side of a capacitor C3 which in turn has its other side connected to the conductor 24. The capacitor C3 and the anode of diode D7 are connected to the cathode of another diode D8 which in turn has its anode connected to one end of a filament lamp L. The other end of the lamp L is connected to the conductor 24. The lamp L and the anode of the diode D8 are connected to the DC conductor 18 by means of a diode D9, which has its anode connected to the conductor 18. It can be seen that the diode D9 and the lamp L are connected across the signal resistor R1; the diode D9 provides a threshold voltage point and will not conduct until overload currents are flowing through the motor and through the DC conductor 18 and hence through resistor R1. Initially the filament of lamp L is cold and has a low resistance and will provide a low impedance path for the current to the conductor 22. The lamp L is shunted by the diode D8 and the capacitor C3 and in the initial overload condition the charging of capacitor C3 will be delayed while the filament of lamp L is cold and provides the low impedance path. However, as the current through lamp L continues, the temperature and hence resistance of its filament increases and hence the charge across the capacitor C3 will then increase more rapidly. When the charge on capacitor C3 reaches a preselected magnitude, the base of the transistor Q1 will be rendered sufficiently positive via the diode D7 and resistors R9 and R8 whereby the transistor Q1 will be rendered nonconductive substantially hence opening the circuit to the unijunction Q2. The diode D8 also adds a threshold voltage which must be overcome before the capacitor C3 will charge. The diode D7 prevents reverse voltage from appearing across the capacitor. Thus, the lamp L provides a time delay function to delay transistor Q1 from being rendered nonconductive until a preselected number of cycles has elapsed. This delayed action is useful in motor operation as it permits the motor to break loose from the condition causing stalling before the current is limited. However, if the cause of the motor stalling continues, as the filament of lamp L becomes heated, the charge in capacitor C3 will increase to the point at which the transistor Q1 will be cut off.

Thus, the control circuit 10, as shown, provides variable speed selection and automatic speed regulation whereby the selected speed will be maintained regardless of changes in the load. Since the load or motor is operated on pulsating direct current, overload protection is provided to prevent damage due to overload as a result of stalling the motor. Note that in a specific use of circuit 10 with a universal motor, the motor 10 will be run on direct current; since with DC operation reactive losses are generally eliminated, higher torques can be obtained for a given speed.

Note that the magnitude of current required is sensed by the potential drop across the signal resistor R1 rather than by sensing the back E.M.F.; with this construction a direct indication of the current through the motor is obtained.

For a universal motor, spark suppression across the load is provided by means of a resistor R10 which is serially connected to a diode D10, with one end of the resistor R10 being connected to the DC conductor 18 and with the cathode of the diode D10 being connected to the other DC conductor 16.

While it will be apparent that the preferred embodiment of the invention disclosed is well calculated to fulfill the objects above stated, it will be appreciated that the invention is susceptible to modification, variation and change without departing from the proper scope or fair meaning of the invention.

What is claimed is:

1. A load control circuit for controlling the magnitude of the current to an electric motor from a source of alternating potential comprising: controlled conduction means connected between the source and the motor for providing a unidirectional current to the motor said controlled conduction means comprising a pair of controlled rectifiers each connected to one side of the source and actuable for varying the magnitude of the current in accordance with variations in the magnitude of a control signal received by said controlled conduction means, control circuit means connected to said controlled conduction means and providing said control signal and including selective control means selectively variable for varying the magnitude of said control signal and regulating circuit means connected to said selective control means for varying the magnitude of said control signal from its selected variations in accordance with variations in the magnitude of the current for automatically varying the magnitude of the current in accordance with variations in the motor load, said selective control means being variable for varying said control signal to selected, fixed magnitudes, said regulating circuit means varying the magnitude of said control signal from said fixed magnitude, said selective control means comprising a selectively variable first impedance circuit with the magnitude of said control signal varying in accordance with the variations in the impedance across said first impedance circuit, said regulating means comprising a variable second impedance circuit connected to said first impedance circuit for varying the impedance across said first impedance circuit in accordance with variations in the magnitude of the current.

2. The circuit of claim 1 further including overload circuit means operatively connected with said control circuit means and responsive to current of a predetermined overload magnitude for varying said control signal to reduce the magnitude of the current to a magnitude less than said overload magnitude.

3. The circuit of claim 2 with said overload circuit means including time delay means for delaying the operation of said overload circuit means for a preselected time period after the occurrence of current of said overload magnitude.

4. The circuit of claim 3 with said time delay means comprising a resistance element having a resistance varying with temperature.

5. The circuit of claim 4 with said resistance element being a filament light bulb.

6. The circuit of claim 1 with said first and second impedance circuits being substantially resistive in character and with said first impedance circuit including a variable resistance member.

7. The circuit of claim 6 with said second impedance circuit including a first controlled conduction device varying in impedance in accordance with the magnitude of the current.

8. The circuit of claim 7 with said controlled conduction means comprising a controlled rectifier and with said first controlled conduction device varying in impedance in accordance with variations in the magnitude of a first signal and with said control circuit means including a sensing resistor in series with the current through the motor and for providing said first signal varying in magnitude in accordance with variations in the magnitude of the current for controlling the actuation of said first controlled conduction device.

9. A load control circuit for controlling the magnitude of the current to an electric motor from a source of alternating potential comprising: controlled conduction means connected between the source and the motor for providing a unidirectional current to the motor and varying the magnitude of the current in accordance with variations in the magnitude of a control signal received by said controlled conduction means, control circuit means connected to said controlled conduction means and providing said control signal and including selective control means selectively variable for varying the magnitude of said control signal and regulating circuit means connected to said selective control means for varying the magnitude of said control signal from its selected variations in accordance with variations in the magnitude of the current for automatically varying the magnitude of the current in accordance with variations in the motor load, said selective control means being variable for varying said control signal to selected, fixed magnitudes, said regulating circuit means varying the magnitude of said control signal from said fixed magnitude, said selective control means comprising a selectively variable first impedance circuit with the magnitude of said control signal varying in accordance with the variations in the impedance across said first impedance circuit, said regulating means comprising a variable second impedance circuit connected to said first impedance circuit for varying the impedance across said first impedance circuit in accordance with variations in the magnitude of the current, over-load circuit means operatively connected with said control circuit means and responsive to current of a predetermined overload magnitude for varying the magnitude of said control signal to reduce the magnitude of the current to a magnitude less than said overload magnitude, said overload circuit means including time delay means for delaying the operation of said overload circuit means for a preselected time period after the occurrence of current of said overload magnitude, said controlled conduction means comprising a pair of controlled rectifiers for providing a full wave rectified potential to the motor, said second impedance circuit including a first controlled conduction device varying in impedance in accordance with variations in the magnitude of a first signal, said control circuit means including a sensing resistor in series with the current through the motor and providing said first signal varying in magnitude in accordance with variations in the magnitude of the current for controlling the actuation of said first controlled conduction device, said overload circuit means comprising a second controlled conduction device connected to said first impedance circuit for substantially changing the impedance across said first impedance circuit responsively to the magnitude of said first signal indicating a current of said overload magnitude, said time delay means including the resistance of a filament of a light bulb.

10. The circuit of claim 9 with said control circuit means including an energy storage device connected to said first impedance circuit and with the magnitude of said control signal being the time interval required for said energy storage device to reach a predetermined charge magnitude.

11. The circuit of claim 9 with said regulating circuit means including timing means responsive to said first signal for maintaining said first controlled conduction device actuated for a period greater than the period of one half cycle of the alternating current potential.

References Cited

UNITED STATES PATENTS

| | | | |
|---|---|---|---|
| 3,437,901 | 4/1969 | Slotkowski | 318—345 X |
| 2,554,695 | 5/1951 | Brown | 318—332 XR |
| 2,734,160 | 2/1956 | Franks et al. | 318—332 XR |
| 3,127,550 | 3/1964 | Gilbreath et al. | 318—345 XR |

ORIS L. RADER, Primary Examiner

R. J. HICKEY, Assistant Examiner

U.S. Cl. X.R.

318—345